US009199124B2

(12) United States Patent
Gravendeel et al.

(10) Patent No.: US 9,199,124 B2
(45) Date of Patent: Dec. 1, 2015

(54) MOBILE ANCHORING DEVICE FOR ATTACHMENT TO A WALL STRUCTURE

(75) Inventors: Bastiaan Gravendeel, Schiedam (NL); Edwin Roberto van der Heide, Rijpwetering (NL)

(73) Assignee: MCNETIQ B.V., Rijpwetering (NL)

( * ) Notice: Subject to any disclaimer, the term of this patent is extended or adjusted under 35 U.S.C. 154(b) by 574 days.

(21) Appl. No.: 13/505,174

(22) PCT Filed: Oct. 27, 2010

(86) PCT No.: PCT/NL2010/050721
§ 371 (c)(1), (2), (4) Date: Aug. 21, 2012

(87) PCT Pub. No.: WO2011/053140
PCT Pub. Date: May 5, 2011

(65) Prior Publication Data

US 2012/0305728 A1 Dec. 6, 2012

(30) Foreign Application Priority Data

Oct. 29, 2009 (NL) ..................................... 2003727

(51) Int. Cl.
*G01L 5/00* (2006.01)
*A63B 27/00* (2006.01)
*A63B 69/00* (2006.01)
*H01F 7/02* (2006.01)
*H01F 7/20* (2006.01)

(52) U.S. Cl.
CPC ............. *A63B 27/00* (2013.01); *A63B 69/0048* (2013.01); *H01F 7/0252* (2013.01); *H01F 7/20* (2013.01)

(58) Field of Classification Search
CPC ...... G01L 5/0033; H01R 43/00; G01M 99/00
USPC ...................... 248/309.4; 73/862.01, 862.041
See application file for complete search history.

(56) References Cited

U.S. PATENT DOCUMENTS 5,807,019 A 9/1998 Meyer

FOREIGN PATENT DOCUMENTS

| | | | |
|---|---|---|---|
| FR | 2517106 | A1 | 5/1983 |
| FR | 2713493 | A1 | 6/1995 |
| NL | 2002038 | C | 3/2010 |
| WO | 2008142716 | A2 | 11/2008 |

OTHER PUBLICATIONS

Industrial Magnetics, Inc., Industrial Magnetics, Inc.—Magnetic Pull Test Kit, Jul. 17, 2007, Web Pages: http://web.archive.org/web/20070717233054/http://www.magnetics.com/product.asp-?ProductID=98 http://www.magnetics.com/downloads/manuals/PullTestKit_Manual_900290.pdf.*
MDFA Pull Test Standard, (Standard MDFA 101 95) as disclosed at the website http://www.intemag.com/MDFA_Pull_Test.html.*
Search Report issued by the Netherlands Patent Office in application NL2003727 on Jul. 19, 2010.

* cited by examiner

*Primary Examiner* — Hezron E Williams
*Assistant Examiner* — Rodney T Frank
(74) *Attorney, Agent, or Firm* — Browdy and Neimark, PLLC

(57) ABSTRACT

A magnetic anchoring method and device provides a support on a wall structure comprising a magnetizable material. The magnetic anchoring device comprises a magnet unit configured to generate a magnetic field to develop an attracting force between the magnet unit and the wall structure. The magnetic anchoring device further comprises a force generating device configured to engage the magnet unit, and to generate a test force in a predetermined direction between the magnet unit and the wall structure, and a force measuring device connected to the force generating device, and configured for measuring the test force.

19 Claims, 1 Drawing Sheet

MOBILE ANCHORING DEVICE FOR ATTACHMENT TO A WALL STRUCTURE

FIELD OF THE INVENTION

The invention relates to the field of anchoring to a wall structure, and more specifically to providing a mobile anchoring device for a wall structure. Still more specifically, the invention relates to providing such mobile anchoring device to be attached to a magnetizable portion of the wall structure. The wall structure may have any shape, and may e.g. extend in a substantially vertical or horizontal direction. In the former situation, the anchoring device may be subjected to forces substantially along (substantially parallel to) a wall structure, whereas in the latter situation, the anchoring device may be subjected to forces substantially away from (substantially at right angles to) an overhead wall structure.

BACKGROUND OF THE INVENTION

In the field of climbing towards or along a wall structure, ropes or cables are used by climbers. Such ropes or cables need to be secured at an anchoring point to an anchoring device firmly attached to the wall structure, i.e. the climber hangs from a rope or cable which in turn hangs from the anchoring device. In traditional climbing along the wall of a mountain, an anchoring device may consist of a pin which is hammered into the mountain wall to provide an anchoring point.

When the wall structure either completely or partially consists of a magnetizable material, such as steel, an anchoring device may comprise a magnet unit which is adapted to generate a magnetic field which causes the anchoring device to attach to the magnetizable material of the wall structure through the development of a magnetic attracting force. A wall structure comprising magnetizable material may be made specially for a specific purpose, e.g. for training of climbing or for entertainment, but can also be a wall structure of e.g. a ship or other vessel or other man-made structure, where an anchoring device is needed at an arbitrary location e.g. for maintenance or repair purposes.

Magnets which generate an attracting force on magnetizable material are generally known in different types, and can be comprised in a magnet unit in an appropriate number, and in an appropriate combination of types, if desired. A first type of magnet is a permanent magnet. A second type of magnet is an electromagnet. A third type of magnet is an electropermanent magnet.

A permanent magnet comprises a magnetic material like ferrite, neodymium (e.g. NdFeB), or other suitable materials, and generates a permanent magnetic field over time. An electromagnet comprises a magnetizable material (e.g. steel) and one or more electric conductors. When a current flows through the conductor(s), the electromagnet generates a magnetic field corresponding to the current. When the current is taken away from the electromagnet the magnetic field reduces to very low magnetic field. An electropermanent magnet comprises a combination of permanent magnetic material and magnetizable material that remains magnetic after magnetizing (e.g. AlNiCo), and one or more electric conductors. When a brief current pulse is applied to flow in the conductor(s) in one direction, the electropermanent magnet generates a magnetic field, whereas when a brief current pulse is applied to flow in the conductor(s) in a reverse direction, the electropermanent magnet generates no, or a low magnetic field. Accordingly, an electropermanent magnet can be switched on and off by applying a pulse of current flowing in a predetermined direction to its conductor(s). For any type of magnet, an additional structure (yoke) of magnetizable material may be combined with the magnet to shape, e.g. guide, focus or redirect, the magnetic field generated by the magnet in a predetermined way at a predetermined location.

It is known e.g. from U.S. Pat. No. 7,052,447 to provide magnet units mountable to a hand or a leg. Each magnet unit comprises one or more permanent magnets. In combination, the magnet units are part of a magnetic climbing system. Each magnet unit is a mobile magnetic anchoring device, i.e. it can be placed and replaced at an anchoring point on a wall structure comprising magnetizable material, where it will be secured to the wall structure by magnetic attracting forces.

FR 2517106 discloses a mobile anchoring device having magnet units attachable to a ceiling. A harness flexibly connects the magnet units which are to be attached to the hands and knees of a person. The contact of each magnet unit with the wall structure is detected by two attachment detectors 44 (FIG. 4) which each comprise a sensing pin 48 slidably mounted in a bore of a housing 45. On the one hand, when the magnet unit is not placed on a surface S, the sensing pin 48 extends to beyond the attachment surface of the magnet unit. On the other hand, when the magnet unit has been placed on the surface, the sensing pin 48 is displaced in the bore of the housing 45 against a force of a spring 47, to close electrical contacts 50. Thus. the attachment detectors 44 establish whether a magnet unit is placed on a wall structure by sensing a sensing pin position.

In order for the magnetic anchoring device not to move relative to the wall structure inadvertently (either by its own weight or by a force directed generally along, or away from the wall structure), the magnetic anchoring device should generate sufficient magnetic attracting force between the magnetic anchoring device and the wall structure. If the magnetic attracting force is insufficient, the magnetic anchoring device may e.g. slide along the wall structure when an external force is applied which has a component along (parallel to) the local surface of the wall structure, and when the frictional force between the magnetic anchoring device and the wall structure is overcome by the external force (the frictional force is proportional to the attracting force between the magnetic anchoring device and the wall structure). Likewise, an external force exerted on the magnetic anchoring device, and having a component away from (at right angles to) the local surface of the wall structure, may detach the magnetic anchoring device from the wall structure if the magnetic attracting force between the magnetic anchoring device and the wall structure is insufficient.

In practice, the surface of a magnetic wall structure will not be perfectly flat, may be damaged and/or may have layers of rust or a surface coating like paint or plastic. Such surface condition may vary from place to place, and provides a variable and unpredictable air gap between the magnetic wall structure and a magnetic anchoring device. The attracting force between the magnetic anchoring device and the wall structure therefore may vary up to the point where a user of a magnetic anchoring device cannot be sure whether a load (force) exerted on the magnetic anchoring device can be supported by the magnetic anchoring device without moving it relative to the wall structure. This may lead to dangerous situations, specifically when people's well-being depends on the reliability of the support provided by the magnetic anchoring device relative to the wall structure.

SUMMARY OF THE INVENTION

It would be desirable to provide a magnetic anchoring device having a reliable attachment to a wall structure comprising magnetizable material, despite differences between local surface conditions of the wall structure.

To better address one or more of these concerns, according to a first aspect of the invention a magnetic anchoring device is provided that provides a support on a wall structure comprising a magnetizable material, the magnetic anchoring device comprising:

a magnet unit configured to generate a magnetic field to develop an attracting force between the magnet unit and the wall structure;

a force generating device configured to engage the magnet unit, and to generate a test force in a predetermined direction between the magnet unit and the wall structure, the test force being adapted to test whether the magnet unit can withstand a required force during use without moving relative to the wall structure; and a force measuring device connected to the force generating device, and configured for measuring the test force.

According to a second aspect of the invention, a method of providing a support on a wall structure comprising a magnetizable material is provided. The method comprises:

providing a magnet unit configured to generate a magnetic field;

providing the magnet unit on the wall structure to develop an attracting force between the magnet unit and the wall structure;

engaging the magnet unit by a test force in a predetermined direction between the magnet unit and the wall structure, the test force being adapted to test whether the magnet unit can withstand a required force during use without moving relative to the wall structure;

measuring the test force;

if it is determined that the test force exceeds a predetermined value without the magnet unit moving relative to the wall structure, then removing the test force.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
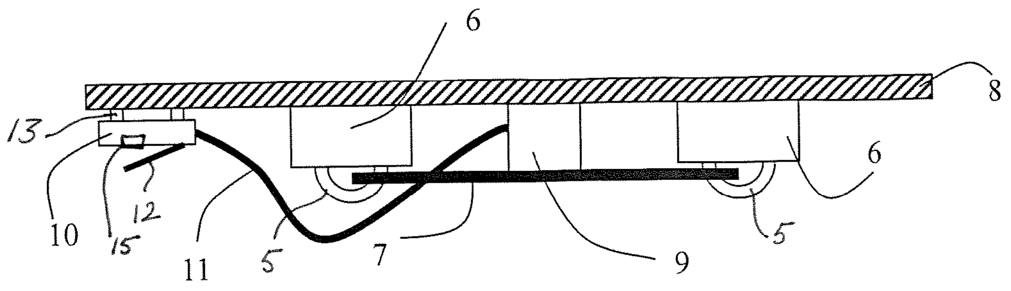
FIG. 1 depicts a schematic side view, partially in cross-section, of an embodiment of a magnetic anchoring device of the present invention.

FIG. 1 depicts a wall structure 8 comprising a magnetizable, such as a ferrous, material. In an embodiment of a magnetic anchoring device, a plurality of magnet units 6 are provided, each of which may comprise one or more permanent magnets, one or more electromagnets, one or more electropermanent magnets, or any combination thereof. Although FIG. 1 shows two magnet units 6, the magnetic anchoring device may comprise more than two magnet units 6, e.g. three magnet units 6 arranged along an imaginary circle on the surface of the wall structure 8. The magnet unit 6 is configured to generate a magnetic field, as a result of which an attracting force exists between the magnet unit 6 and the wall structure 8. Each magnet unit 6 is provided with an attachment structure 5 such as a ring section, connected to the magnet unit 6, possibly in a removable manner. A yoke 7 engages the attachment structures 5 of the magnet units 6, and provides a mechanical coupling between the magnet units 6.

A force generating device 9 is provided between a surface part of the wall structure 8 and the yoke 7. The force generating device 9 is configured to exert a test force directed at right angles to the surface part of the wall structure 8, and directed away from the wall structure 8. In an embodiment, the force generating device 9 is e.g. an electric, pneumatic or hydraulic actuator. In the illustrated embodiment, the force generating device 9 is a hydraulic piston/cylinder unit which can be pressurized by a pump 10 through a hydraulic line 11. The pump 10, which may be a hand-driven pump 10 with a handle 12, may comprise magnets 13 to semi-permanently attach the pump 10 to the wall structure 8.

A force measuring device 15 is configured for measuring the test force exerted by the force generating device 9. In case of the force generating device 9 being a hydraulic piston/cylinder unit, the pump 10 may comprise a force measuring device 15 embodied as a hydraulic pressure meter, calibrated to indicate the test force corresponding to a pressure in the hydraulic system.

In use, the force generating device 9, when energized, pushes with a predetermined force against the yoke 7, or pulls with a test force at the yoke 7, in a direction away from the wall structure 8. Through the yoke 7 and the attachment structures 5, this predetermined force is transmitted to the magnet units 6. Thus, forces are exerted on the magnet units 6 in a direction away from the wall structure 8. When the test force exerted by the force generating device 9 exceeds a predetermined value without any of the magnet units 6 moving relative to the wall structure, i.e. becoming detached from the wall structure, the magnetic anchoring device is deemed to be able to withstand a required force which will not be exceeded during use, possibly with a predetermined safety margin. The force generating device 9 may then be deactivated. If required, the force generating device 9 and the pump 10 may then be removed, and the magnetic anchoring device is ready for use as a support attached to the wall structure. In use, the yoke 7 and/or the attachment structures 5 may support a rope, a chain or any other flexible or rigid mechanical structure which needs to be anchored to the wall structure 8. According to FIG. 1, the wall structure 8 may be an overhead (generally horizontally extending) wall, and the magnetic anchoring device may be used to support a mechanical structure hanging from the overhead wall.

Figure 2:
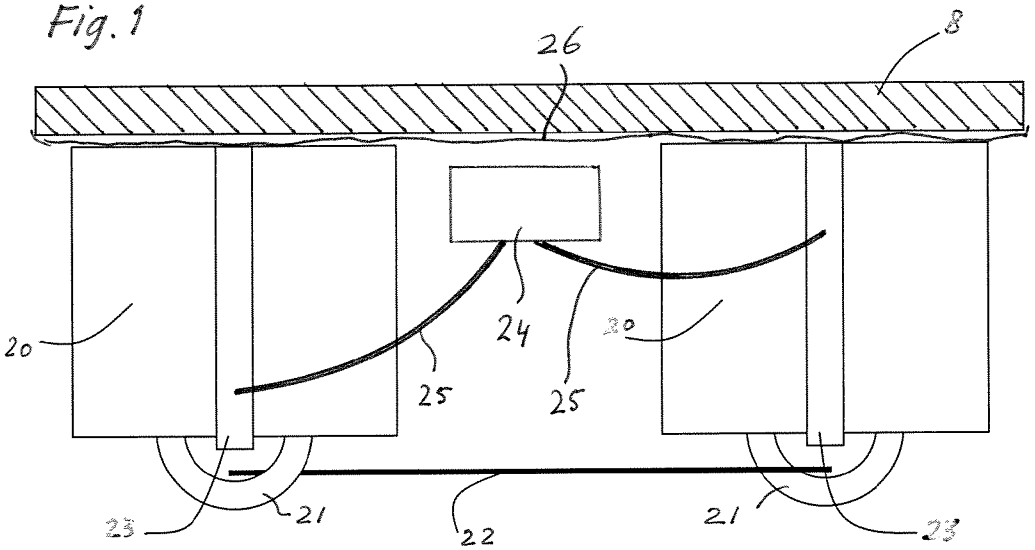
FIG. 2 depicts a schematic side view, partially in cross-section, of a further embodiment of a part of a magnetic anchoring device of the present invention.

FIG. 2 illustrates a pair of magnet units 20 each having an attachment structure 21, which in the embodiment shown is a ring segment. A yoke 22 is coupled between the attachment structures 21 of the magnet units 20. As illustrated, the yoke 22 may be a bar or rod inserted at both ends into openings defined by the attachment structures 21.

Each magnet unit 20 is combined with a force generating device 23. The force generating device 23 may be embodied as an electric, pneumatic or hydraulic actuator which is attachable or attached or secured to the corresponding magnet unit 20, and which is configured for exerting a test force acting between the magnet unit 20 and a surface of the wall structure 8 at or near a surface of the wall structure 8 which is contacted by the magnet unit 20. In an embodiment, the force generating device 23 may be attached to the side of the corresponding magnet unit 20, or several force generating devices 23 may be attached to different sides of one corresponding magnet unit 20. In another embodiment, the force generating device 23 may be attached in a center of the corresponding magnet unit 20.

Each force generating device 23 is connected to a force measuring device 24 through an appropriate line 25. Like in FIG. 1, the force generating device 23 may be a hydraulic piston/cylinder unit, where the line 25 is a hydraulic line, and the force measuring device 24 is a pressure meter calibrated to provide a reading corresponding with a test force exerted between the corresponding magnet unit 20 and the wall structure 8. The force measuring device 24 may indicate whether the test force exceeds a predetermined, required level to assure that the attracting force between the wall structure 8 and the magnet unit 20 is sufficient to provide a support for any mechanical structure to be connected to each magnet unit 20 or to an assembly of magnet units 20, despite an uneven and locally different coating 26 on the wall structure 8.

Figure 3A:
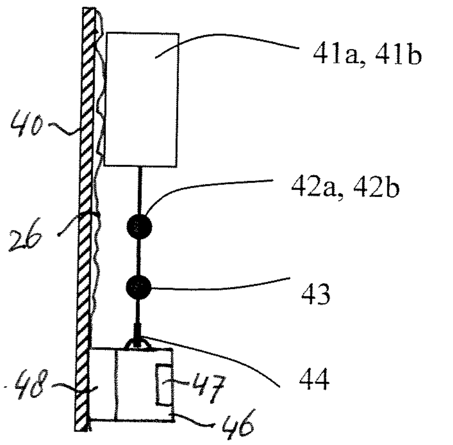
FIG. 3*a* depicts a schematic side view, partially in cross-section, of a further embodiment of a part of a magnetic anchoring device of the present invention.
Figure 3B:
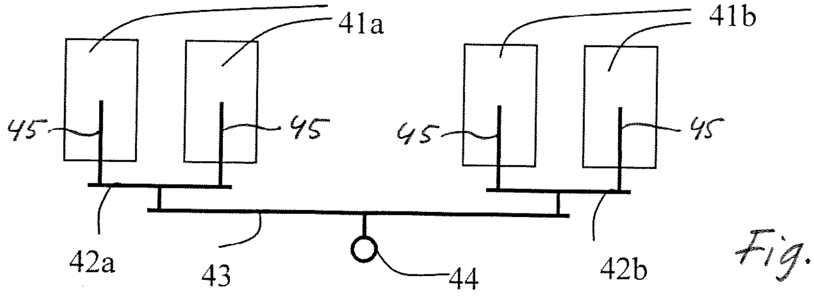
FIG. 3*b* depicts a schematic front view of the part of the magnetic anchoring device of FIG. 3*a*.

FIGS. 3*a* and 3*b* illustrate a generally vertically extending wall structure 40 comprising a magnetizable material. Magnet units 41*a*, 41*b* are configured to be attached to the wall structure 40 by attracting forces generated by magnets in the magnet units 41*a*, 41*b*. Each magnet unit 41*a*, 41*b* has an attachment structure 45. Yoke 42*a* connects or couples the (attachment structures 45 of the) magnet units 41*a*, while yoke 42*b* connects or couples the (attachment structures 45 of the) magnet units 41*b*. In turn, the yokes 42*a* and 42*b* are coupled by a yoke 43 provided with an attachment structure 44.

As illustrated in FIG. 3*a*, a force generating device 46 is placed on the wall structure 40, and connected to the attachment structure 44. The force generating device 46 comprises a magnet unit 48 to attach the force generating device 46 to the wall structure 40. In use, the force generating device 46 generates a test force by pulling on the attachment structure 44, thereby exerting a force along (parallel to) the surface of the wall structure 40. This test force generates a reaction friction force at the magnet units 41*a*, 41*b* on the one hand, and the magnet unit 48 on the other hand. The value of the test force may be indicated by a force measuring device 47. If, during application of the test force, none of the magnet units 41*a*, 41*b*, 48 slides along the surface of the wall structure (or a coating 26 thereon), the assembly of magnet units 41*a*, 41*b* can take up four times a test force that can be taken up by each one of the magnet units 41*a*, 41*b*.

Figure 4:
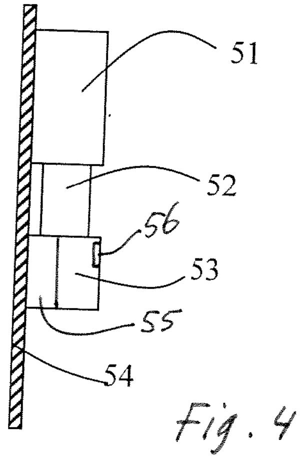
FIG. 4 depicts a schematic side view, partially in cross-section, of a further embodiment of a magnetic anchoring device of the present invention.

FIG. 4 illustrates a (generally vertically extending) wall structure 54 comprising a magnetizable material. A magnetic anchoring device comprises a magnet unit 51. For testing the attachment of the magnet unit 51 to the wall structure 54, a force generating device 53 attached to the wall structure 54 by a magnet unit 55, and comprising an actuator 52 is used.

In use, the force generating device 53 and actuator 52 exert a test force on the magnet unit 51, along a surface of the wall structure 54. If, at a predetermined test force indicated by a force measuring device 56, neither the magnet unit 51 nor the magnet unit 55 move along the surface of the wall structure 54, the magnetic anchoring device can be guaranteed to support at least a predetermined part of the test force in the direction in which it was applied. After testing, the force generating device may be removed.

It is noted that the force measuring device may be configured to provide an indication of an actual test force, where it is left to a human observer or user to judge whether the value of the test force meets the requirement. This indication may be analog (e.g. a needle on a scale, possibly having ranges marked as acceptable or safe), or digital, or merely as a light or a color of a light indicating that a predetermined test force has been reached.

As explained in detail above, the magnetic anchoring device according to the invention provides a support on a wall structure comprising a magnetizable material. The magnetic anchoring device comprises a magnet unit configured to generate a magnetic field to develop an attracting force between the magnet unit and the wall structure. The magnetic anchoring device further comprises a force generating device configured to engage the magnet unit, and to generate a test force in a predetermined direction between the magnet unit and the wall structure, and a force measuring device connected to the force generating device, and configured for measuring the test force.

As required, detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A magnetic anchoring device for providing a support on a wall structure comprising a magnetizable material, the magnetic anchoring device comprising:

a magnet unit configured to be placed at a location on the wall structure, and to generate a magnetic field to develop an attracting force between the magnet unit and the wall structure;

a force generating device to be placed on the wall structure and engaging the magnet unit, said force generating device operable to generate a test force along a surface of the wall structure between the magnet unit and the wall structure, the test force having a predetermined value to test whether the magnet unit can withstand a required force to be exerted on the magnet unit during use without moving relative to the wall structure; and a force measuring device connected to the force generating device, to measure the test force.

2. The magnetic anchoring device of claim 1, wherein the force measuring device is configured and operable to indicate whether the test force exceeds a predetermined level.

3. The magnetic anchoring device of claim 1, wherein the force generating device comprises an electric, pneumatic or hydraulic actuator.

4. The magnetic anchoring device of claim 1, wherein the force generating device comprises a hydraulic piston/cylinder unit.

5. The magnetic anchoring device of claim 1, wherein the force generating device is attached to the side of the corresponding magnet unit.

6. The magnetic anchoring device of claim 1, wherein the magnet unit comprises an attachment structure for transmitting the test force directly to the magnet unit.

7. The magnetic anchoring device of claim 1, comprising at least two magnet units mechanically coupled by a yoke for transmitting the test force directly to the magnet units.

8. The magnetic anchoring device of claim 7, wherein the force generating device is configured to be attached between a surface part of the wall structure and the yoke.

9. The magnetic anchoring device of claim 1, wherein the force generating device comprises a further magnet unit configured to be placed at a location on the wall structure, and to generate a magnetic field to develop an attracting force between the further magnet unit and the wall structure, to attach the force generating device to the wall structure, wherein said test force further is operable to test whether the further magnet does not move relative to the wall structure when the force generating device operates to generate said predetermined value of the test force along a surface of the wall structure between the magnet unit and the wall structure.

10. A method of testing an anchoring of a magnet unit on a wall structure comprising a magnetizable material, the method comprising:

providing the magnet unit, generating a magnetic field, on the wall structure at a location thereof to develop an attracting force between the magnet unit and the wall structure;

engaging the magnet unit with a force generating device to apply the test force in a predetermined direction between the magnet unit and the wall structure;

measuring the test force applied by the force generating device;

predetermining a value of the test force from a required force to be exerted on the magnet unit during use;

if it is determined that the predetermined value of the test force can be applied by the force generating device without the magnet unit moving relative to the wall structure, then removing the test force.

11. The method of claim 10, wherein the force generating device is operated to generate a test force acting directly on the magnet unit.

12. The method of claim 10, wherein the test force is applied at right angles to a surface of the wall structure.

13. The method of claim 10, wherein the test force is applied parallel to a surface of the wall structure.

14. The method of claim 10, wherein the test force is applied between the magnet unit and a surface of the wall structure at or near a surface of the wall structure which is contacted by the magnet unit.

15. The method of claim 10, further comprising placing the force generating device on the wall structure.

16. The method of claim 10, further comprising attaching the force generating device to a side of the magnet unit, or in a center of the magnet unit.

17. The method of claim 10, further comprising transmitting the test force to an attachment structure being part of the magnet unit.

18. The method of claim 10, further comprising transmitting the test force to a yoke coupling at least two magnet units.

19. The method of claim 10, wherein the force generating device is attached between a surface part of the wall structure and the yoke.

* * * * *